3,611,487
APPARATUS FOR SONIC NUCLEATION FOAMABLE MATERIALS
Theodore H. Fairbanks, Liverpool, Pa., assignor to FMC Corporation, Philadelphia, Pa.
Original application Feb. 28, 1968, Ser. No. 708,870. Divided and this application Jan. 22, 1970, Ser. No. 5,037
Int. Cl. B29f 3/04
U.S. Cl. 18—12 DV
2 Claims

ABSTRACT OF THE DISCLOSURE

Apparatus for extruding molten foamable materials which includes an extruder having a discharge orifice and an arcuate sonic transducer coupled to the extruder and having a concave surface facing the extruder discharge orifice whereby the energy output from such transducer may be focused into a desired region within the molten foamable material as it approaches the discharge orifice for effecting incipient bubble formation.

Figure 1:
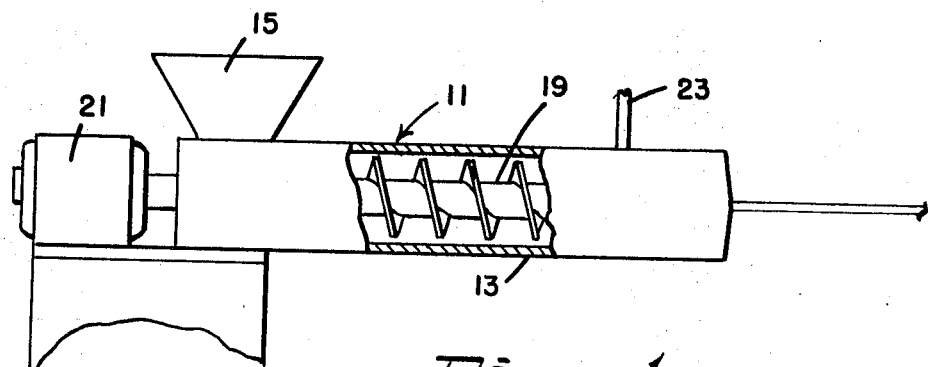

This application is a division of my application Ser. No. 708,870, filed Feb. 28, 1968.

The present invention is directed to an improved apparatus for making foamed thermoplastic articles by extrusion.

Melt extrusion of thermoplastic materials containing foaming agents, followed by quenching, generally results in foamed products having large bubbles which are non-uniform in size and distribution. Some improvement in providing foamed products with small sized bubbles can be achieved by incorporating, in the foamed thermoplastic material, inert finely-divided solids which serve as nucleating agents in the formation of foam cells.

More recently, a process has been proposed wherein an extruded mixture of a foamable polymer and a foaming agent is subjected to the action of a cyclic application of a sudden deformation pressure after such mixture leaves an extrusion orifice and prior to initiation of normal foaming action. The so treated extrudate is then permitted to expand and, as described in United States Pat. No. 3,072,584, provides a fine-celled foamed product having a substantially uniform distribution of bubbles. A somewhat similar foamed product is also provided by a process as described in United States Pat. No. 3,327,031 wherein pulsating mechanical energy is applied to an extruded mixture of a molten thermoplastic resin and an inert gaseous foaming agent at the orifice from which such mixture is extruded and passes into the atmosphere.

In all the processes described above, control is lacking over the growth of cells in the foamable thermoplastic material during its expansion. While certain of these known processes may facilitate the production of fine-celled foamed products, size uniformity is often not achieved. Moreover, foamed products having a large number of small bubbles are not always suited for certain purposes. For example, in foamed products which are intended to be oriented by subsequent stretching it is often desirable that such products contain a small number of large bubbles which are substantially uniform in size. Accordingly, a primary object of this invention is to provide a generally new or improved and more satisfactory apparatus for making foamed products by extrusion.

Another object of this invention is to provide an apparatus for making foamed products by extrusion having bubbles of desired and generally uniform size.

Still another object is the provision of an apparatus by which cell growth in a foamable thermoplastic material may be readily controlled.

A further object is to provide an extrusion apparatus in which controlled bubble formation may be initiated within a molten foamable thermoplastic material prior to the extrusion thereof through a die opening.

Still further objects will be apparent from the following description.

These objects are accomplished in accordance with the present invention by an extrusion apparatus in which molten thermoplastic material under pressure and having a gas dissolved therein is subjected to sonic vibrations as it approaches and is extruded into a zone of lower pressure. The concentration of the gas dissolved in a molten thermoplastic material is preferably such that a super-saturated solution of dissolved gas is in the molten thermoplastic material as such material approaches and issues from the extrusion die orifice and into the zone of lower pressure. This zone of super-saturated gas may begin at the exit of the extrusion die orifice but preferably extends at least slightly into such orifice.

The sonic or ultra-sonic vibrations are focused or concentrated preferably near the beginning of the zone in which there is a super-saturated solution of dissolved gas in the molten thermoplastic material. When shaping such foamable molten thermoplastic material into a filament, the sonic vibrations are preferably focused at a point which is located generally along the axis of the material being shaped. On the other hand, in the extrusion of a film or sheet the vibrations are focused in a line located generally centrally within the material being shaped and extending along the length of the extrusion die opening and substantially perpendicular to the direction of extrusion.

From the above description, it will be noted that the sonic vibrations are focused preferably close to the beginning of the zone in which a super-saturated solution of dissolved gas exists in the molten thermoplastic material. The sonic vibrations cause incipient bubble formation to occur at a predetermined instant within the molten thermoplastic material so that all such bubbles can together grow and generally reach the same size as the extruded material passes into the zone of lower pressure and is quenched. The zone at which is formed a super-saturated solution of dissolved gas in the molten thermoplastic material and the location at which the sonic vibrations are focused may be varied somewhat, as indicated above. Thus, these considerations, taken with the location at which the extruded foamed material is quenched facilitates close control over the growth of cells in the thermoplastic material during its foaming and provides for foamed articles having bubbles of desired and uniform sizes.

Of particular importance, and as distinguished from the prior art teachings, with the apparatus of the present invention incipient bubble formation is effected by focused sonic vibrations and is caused to occur within and preferably near the beginning of the zone at which a super-saturated solution of dissolved gas exists in the molten thermoplastic material. The formation of bubbles within a thermoplastic material while it is at or within the orifice of an extrusion die carries with it the risk that bubbles which are near the surface of the shaped thermoplastic material will rupture and provide an undesirably rough-surfaced product and/or disturb the flow characteristics of such material as it is being extruded. However, with the teachings of the present invention this risk is avoided or minimized by focusing the sonic vibrations at some region within the thermoplastic material which is being shaped. Thus, the incipient bubble formation induced by such sonic vibrations occurs, not on the surface, but within such material itself. The growth of these initial bubbles takes place concomitantly with their travel toward or into the zone of lower pressure and will therefore generally appear along the surface of the foamed material as or after it leaves the extrusion orifice.

The apparatus of the present invention differs from that of conventional construction by employing one or more arcuate sonic transducers. These transducers are mounted on the extruder so as to present a concave surface facing the extrusion die orifice whereby the energy emanating therefrom may be focused into a desired region.

The teachings of the present invention are adapted for use with a variety of thermoplastic materials which are capable of being expanded into a foamed article, polyethylene, polypropylene, vinyl chloride, etc. The foaming agent employed may have a normally gaseous compound or low boiling liquids which are gaseous at the temperature of the molten thermoplastic material employed. Conventional of such employed agents include methyl chloride, n-pentane, ethylene, propylene, butylene, fluorocarbons such as 1,2-dichloro-tetrafluoroethane, nitrogen, carbon dioxide, argon, etc. The gaseous foaming agent may also be provided by the decomposition of solid foaming agents within the extruder and include materials such as azodicarbonamide, 4,4' - oxybis-(benzene-sulfonyl-hydrazide), 4,4'-oxybis (benzene-sulfonyl-semiperbenzide), bis-benzene sulfonyl hydrazide, barium azeodicarboxylate, etc. The presence of conventional nucleating agents in the molten thermoplastic material is not required but may be employed if desired.

Figure 2:
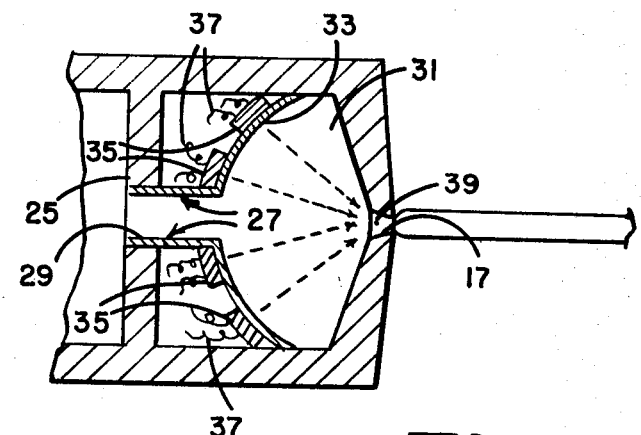
Figure 3:
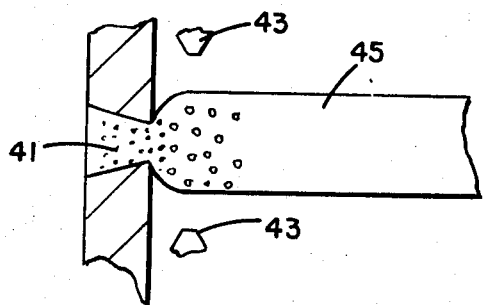

In the drawing, FIG. 1 is a side view of a film extrusion apparatus incorporating the teachings of the present invention, with a portion thereof being broken away;

FIG. 2 is a fragmentary transverse vertical section taken through the apparatus shown in FIG. 1; and FIG. 3 is a diagrammatic illustration showing the extrusion of a foamed film or sheet in accordance with the present invention.

With reference to FIG. 1 of the drawing, the extrusion apparatus or die 11 of the present invention includes a heated extrusion barrel 13, having a feed hopper 15 at one end and a discharge orifice 17 at its opposite end, an extruder screw 19 positioned within the barrel 13 and a motor 21 for rotating the screw 19. A suitable thermoplastic material, such as polyethylene, is delivered into the extrusion barrel 13 through the feed hopper 15 and is heated to a molten condition concomitantly with its advancement toward the extrusion orifice 17 by the rotating screw 19.

In the apparatus illustrated, a normally gaseous blowing agent, as for example nitrogen, is introduced under pressure into the extrusion barrel 13 through a conduit 23 and is dissolved in the molten polymer during its continued advancement. The solution of gas in the molten material is such as to become a super-saturated solution as the molten material approaches and enters into the zone of lower pressure outwardly of the extrusion orifice 17.

As shown in FIG. 2 of the drawing, partitions 25 extend into the extrusion barrel 13 and, together with members 27, define a passage 29 and a chamber 31 which is adjacent to the extrusion orifice 17. The members 27 each have arcuate walls 33, the concave surfaces of which face the extrusion orifice 17. Coupled tightly against the convex surfaces of each of these walls 33 is placed one or more transducers 35, and preferably electro-acoustic transducers, such as quartz crystals, each having wires 37 by which they may be simultaneously energized from a suitable source of high frequency oscillations, not shown. The transducers or quartz crystals 35 themselves are of known construction and the selection and manner of attachment to the extruder barrel will depend upon such factors as the temperature conditions encountered and the transducer cooling requirements.

The configurations of the quartz crystals 35 are such that their center of curvature 39 lies within and at the beginning of the zone at which a super-saturated solution of gas exists within the molten thermoplastic material. It is at this center 39 that the output energy of the plurality of crystals 35 is focused and, as a result of these concentrated sonic vibrations, incipient bubble formation occurs within the molten thermoplastic material as indicated at 41 in FIG. 3. In other words, the maximum concentration of sonic energy at the center of curvature 39 serves to nucleate the gas dissolved within molten thermoplastic material and thus initiate bubble formation.

The bubbles of gas first formed within the molten thermoplastic material at the center of curvature 39 together grow as the pressure is reduced on the molten material during its continued travel toward and into the atmosphere outwardly of the extrusion orifice 17. The growth of the bubbles will, of course, depend upon the rate and degree of pressure reduction on the molten thermoplastic material. More important, growth of all bubbles will be generally at the same rate until the extruded thermoplastic material is set, as by cool air supplied by nozzles 43, so that the bubbles or cells in the resulting article 45 will be of generally the same size or fall within a narrow distribution of cell sizes.

While the curvature of the electroacoustic transducers 35 determines the location at which their output energy is focused, care must be exercised in the construction of the apparatus to insure that the maximum energy generated by such crystals 35 is transmitted through the walls 33. In general, this latter consideration is satisfied by insuring that the product of the density of the material forming the walls 33 and the velocity of the sonic vibrations in such material is equal to that of the crystals and, by having the walls 33 of such thickness as to tune the same to the vibration frequency of the crystals.

It is to be understood that changes and variations may be made without departing from the spirit and scope of the invention as defined in the appended claims.

I claim:

1. In an apparatus for making foamed articles including an extrusion die having a passage extending therethrough, a discharge orifice at one end of said passage, and means for advancing under pressure through the passage and discharge orifice and into a zone of lower pressure a molten thermoplastic material having sufficient gas dissolved therein as to provide a super-saturated solution of dissolved gas in the molten thermoplastic material as such material approaches and enters into the zone of lower pressure, the improvement comprising a sonic transducer coupled to the extrusion die by an arcuate member positioned within said passage, said sonic transducer having a concave surface, said arcuate member having a concave wall facing the extrusion die discharge orifice and a convex wall against which is tightly coupled the concave surface of said sonic transducer whereby the energy output from said transducer is focused into a region of the molten thermoplastic material containing a super-saturated solution of dissolved gas so as to cause incipient bubble formation therein.

2. Apparatus as defined in claim 1 wherein said arcuate member and sonic transducer are acoustically tuned to the same vibration frequency.

References Cited

UNITED STATES PATENTS

| | | |
|---|---|---|
| 2,408,627 | 10/1946 | Green. |
| 3,071,809 | 1/1963 | Lerch _____ 264—23 |
| 3,072,584 | 1/1963 | Karpovich _____ 264—53 X |
| 3,327,031 | 6/1967 | Boyer et al. |

FOREIGN PATENTS

| | | |
|---|---|---|
| 1,477,607 | 3/1967 | France. |

J. SPENCER OVERHOLSER, Primary Examiner

M. O. SUTTON, Assistant Examiner

U.S. Cl. X.R.

264—23, 47